Dec. 27, 1955  D. C. BROWN ET AL  2,728,618
OIL-BATH TURNTABLE
Filed Jan. 25, 1954
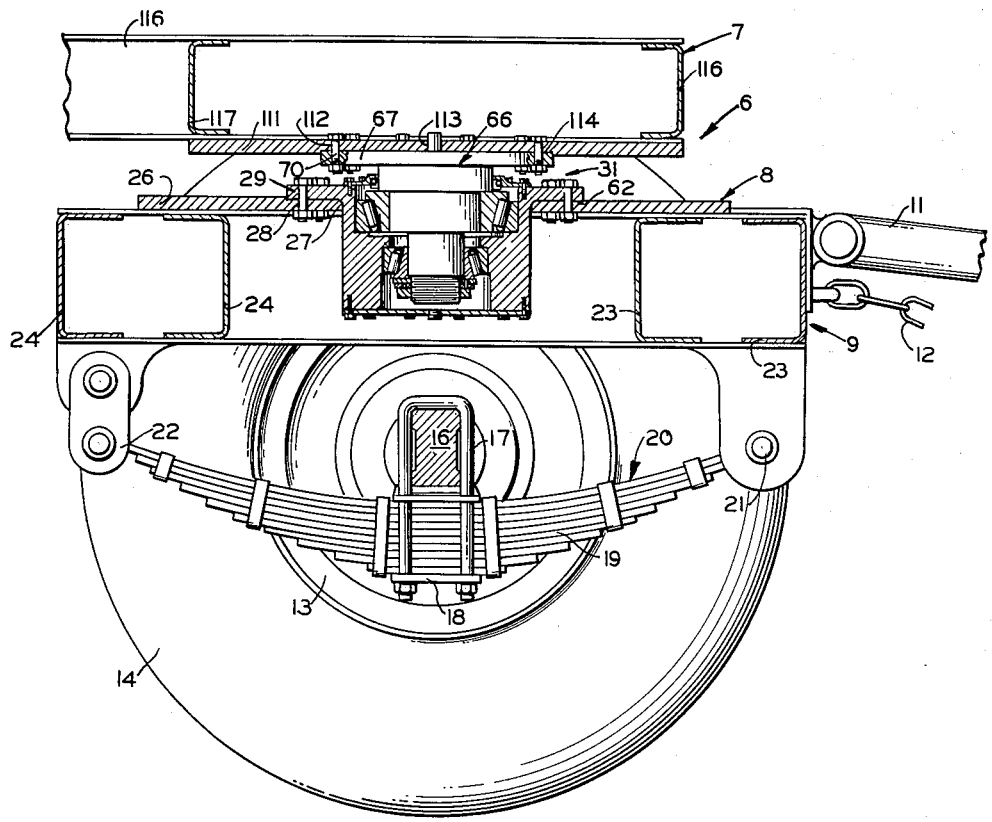
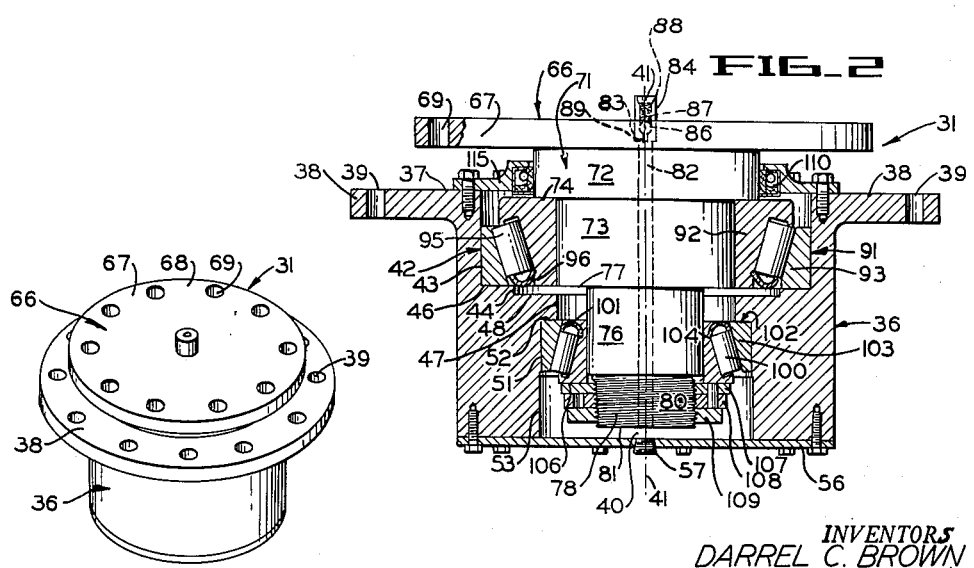
INVENTORS
DARREL C. BROWN
JACK B. O'HARRA
CHARLES A. SANSOME
BY Marcus Lothrop
ATTORNEY United States Patent Office 2,728,618
Patented Dec. 27, 1955

2,728,618

OIL-BATH TURNTABLE

Darrel C. Brown, Sacramento, Jack B. O'Harra, Orinda, and Charles A. Sansome, Ventura, Calif.

Application January 25, 1954, Serial No. 405,798

4 Claims. (Cl. 308—222)

The invention relates to turntables and more especially to oil-immersed anti-friction bearing turntables used in connection with vehicular trailers of the self-supported type.

Fifth wheel bearing structures of the kind now frequently utilized on full trailers, that is trailers of the self-supported type, as distinguished from semi-trailers which are partly supported by a tractor or truck vehicle, are subject to numerous operational difficulties. The rollers in the present-day fifth wheels tend to become flattened during a long haul. Where but few turns in the road are encountered during a long haul, as for example in the western part of the United States, the continuous downward thrust of a loaded trailer on the same portion of the rollers of the kind commonly used today, accompanied by the repetitive shocks induced by the roadway, appear to wear a flattened portion on the rollers, and sometimes even to crack the rollers. Flattened or cracked rollers are resistant to smooth rolling motion, and render the bearing structure less effective, or in some cases inoperative. In this situation, a sudden turning of the tractor hauling the trailer is not followed by a smooth rotation of the bearing structure; instead a resistance to rotation is encountered, causing the bearing to drag and the trailer to whip in an erratic manner, or even to jackknife. Furthermore, the presently used kind of bearing structures are often inadequately sealed from the atmosphere, and, as a consequence, dust and other deleterious matter, such as moisture, enter the bearing elements. Where moisture is present, freezing and expansion of the moisture frequently causes fracturing of the bearing structure. Rust, corrosion and other undesirable consequences are also encountered, requiring frequent maintenance, repair and replacement of the presently used kinds of bearing structure.

It is therefore an object of our invention to provide an oil-bath turntable especially suitable for use on full trailers wherein the load bearing rotatable elements are at all times immersed in a bath of lubricating oil during operation.

It is a further object of our invention to provide an oil-bath turntable in which excessive oil-bath pressure, if any, is automatically relieved.

It is yet another object of the invention to provide an oil-bath turntable in which foreign solid matter is excluded from the bath of oil and the oil-immersed moving parts.

It is a still further object of the invention to provide a turntable having its major weight bearing components surrounded by an oil-bath and which excludes water and moisture from the oil-bath and interior working parts of the turntable and thus prevents rusting of the parts and harm which arises from such freezing of the water as might otherwise occur.

It is a yet further object of our invention to provide a turntable having a first anti-friction bearing with rollers inclined in one direction to resist not only radial but vertical forces and a second anti-friction bearing having rollers inclined in another direction to resist forces not only in a radial but in a vertical direction in opposition to that imposed upon the first bearing.

It is a further object of our invention to provide a turntable useful as an entity or as a unit for installation on existing trailer frame and trailer dolly members.

It is a yet further object of our invention to provide a turntable which is economical to manufacture, yet which is long lived and which is, by actual tests and experiments, capable of outlasting present-day bearing members used for the same purposes by a very considerable ratio.

It is still another object of our invention to provide a turntable which is rotatable about a fixed axis and which is effective to bring into alignment for rotation about the same fixed axis a previously unaligned trailer frame and trailer dolly.

It is another object of our invention to provide a generally improved oil-bath turntable.

Other objects, together with the foregoing, are obtained in the embodiment described in the accompanying description and shown in the accompanying drawings, in which:

Figure 1 is a vertical median section showing the turntable installed on the forward portion of a full trailer.

Figure 2 is a section of the turntable unit itself or entity quite similar to the section of the unit shown mounted in Figure 1 but to an enlarged scale.

Figure 3 is a top perspective of the turntable unit.

Numerous kinds of truck or tractor and trailer installations exist. The particular embodiment illustrated in Figure 1 shows a front portion of a self-supported or full trailer installation, generally designated 6, and comprising a forward trailer structure 7 or frame and a trailer dolly 8 or wheel truck. Pivotally mounted on the leading edge 9 of the dolly and extending forwardly to a tractor or vehicular truck (not shown) is a draw bar 11 movable upwardly and downwardly, and the customary safety chain 12. Supporting the rearward end of the trailer frame 7 is another set of wheels and attendant structure (not shown) but which is ordinarily fixed in position and is not horizontally rotatable about a vertical axis as is the forward dolly structure 8 here shown.

Horizontal rotation between the dolly 8 and the forward end of the trailer frame 7 is necessary to permit the trailer to turn and to follow the tractor hauling the trailer. Supporting the dolly 8 is a pair of ground engaging wheels 13 having pneumatic tires 14 mounted thereon and connected by a transverse member, such as an axle 16, the axle having mounted thereon adjacent each wheel a pair of downwardly projecting U bolts 17 with a clamping plate 18 confining against the bottom side of the axle a plurality of resilient leaf springs 19 and forming a spring 20. Each spring has one of its ends, as for example, its leading or forward end, mounted on a fixed bracket 21 and its other end mounted on a pivoting bracket 22 permitting of longitudinal separation and approach of the two brackets as the spring moves upwardly and downwardly, respectively, in response to motion of the axle.

The forward bracket 21 and the rearward bracket 22 support transverse channel members 23 and 24, respectively. In turn, the channel members 23 and 24 support a substantially horizontal dolly plate 26 having in its center an aperture 27, or opening, or well, fabricated preferably to a circular outline. Surrounding the aperture 27 and spaced radially therefrom is a plurality of openings 28 in the plate, the openings assuming a circular pattern concentric with the aperture.

As most clearly appears in Figure 2, the turntable unit 31 comprises a bearing housing 36 or body having at its upper end 37 a peripheral mounting flange 38 having a plurality of openings 39 therein to accommodate fastenings, such as through-bolts 29, for mounting the flange 38 on the dolly plate 26.

As most clearly appears in Figure 2, the bearing housing, or turntable body, in installed position assumes a vertical attitude and is conveniently symmetrical about a vertical axis 41. Likewise symmetrical about the vertical axis 41 is a central opening, generally designated 42, extending through the entire bearing housing and comprising a series of stepped or counterbored portions. An uppermost or first counterbored portion 43 is succeeded by a second counterbored portion 44 of a lesser diameter than the first counterbored portion, thus providing a shoulder 46 between the two counterbores. A third counterbored portion 47, having a still smaller diameter affords a shoulder 48 or step. Progressing downwardly, a fourth counterbored portion 51 has a greater diameter than the counterbored portion 47 and affords a shoulder 52 between the two counterbored portions 47 and 51. For convenience in machining the fourth counterbored portion 51, it is sometimes found that still another or fifth counterbored portion 53 is of assistance.

Covering the bottom of the central opening 42 of the bearing housing and mounted on the housing with air tightness is a closure plate 56 or cover plate having an oil filling and draining plug 57 giving access to the bottom of the central opening and thus permitting lubricating oil to be placed within the central opening in the bearing housing, as well as allowing drainage of the oil when desired. Oil filling and draining can be undertaken with the turntable in situ and in the attitude shown in Figures 1 and 2; in the event the turntable is removed to a shop, however, oil filling is frequently performed with the turntable in an upside down position.

The bearing housing is conveniently fitted within the circular aperture 27 within the dolly plate 26 and for stability and ease of installation, the housing flange 38 is supported by the top side of the dolly plate 26. It is not necessary that the bearing housing fit tightly within the aperture 27 since a plurality of fastenings, such as the through-bolts 29, pass through the corresponding openings in the housing flange and the dolly plate and when taken up tightly adequately hold the bearing housing in proper location. For greater ease in positioning the bearing housing for registry with the dolly plate bolt openings, the provision of a low-relief counterbored portion 62 in the dolly plate is very effective, the shallow counterbored portion 62 being machined to a diameter slightly in excess of the outside diameter of the bearing housing flange 38.

As a part of the turntable entity 31 and serving, in installed position, to support and locate the trailer frame with respect to the dolly, is a rotatable spindle, generally designated 66, and comprising at its upper end a circular mounting flange 67. Near the outer margin 68 of the mounting flange 67 is a plurality of openings 69 for securing the spindle to the trailer frame as by fastenings, such as through-bolts 70. Depending from the bottom side of the flange 67 and arranged in a series of stepped-down portions, is a spindle shaft 71. From the uppermost cylindrical portion 72 of the shaft a first stepped-down portion 73 is provided to give a shoulder 74. A second stepped-down portion 76 is also formed on the shaft 71 providing a second shoulder 77. The third and lowermost portion of the shaft 78 is provided with screw threads 80. From the lower end 81 of the screw threaded portion 80 and passing in a vertically upward direction through the interior of the spindle conveniently in a position concentric with the vertical axis 41, is a channel 82 having at its upper end an enlarged or counterbored portion 83 to receive a ball check valve 84 or pressure relief valve having in the interior thereof valving, including a ball 86, a spring 87 and center-drilled shoulder nut 88, against which the upper end of the spring bears. Below the ball is a communicating passageway 89 for connecting the main vertical channel 82 and contiguous oil-bath chamber 40 with the atmosphere in the event the ball 86 is lifted off its seat, either by an excessive amount of oil introduced within the interior opening in the bearing housing or as a result of excessive oil pressure caused, for example, by the oil heating and expanding. The ball check valve and vertical channel are also important in that during filling of the oil bath, with the turntable in the installed attitude shown in Figure 2, for example, venting to the atmosphere of air located in the channel 82 and displaced by the oil, is permitted, the displaced air venting or being forced upwardly through the channel 82, passageway 89 and valve 84. Concurrently, as the oil enters through the bottom drain hole, the oil, being under considerable pressure, forces ahead of it and upwardly any air in the spaces such as the counterbores 53, 47 and 44 and in the bearing interstices located at an elevation higher than the bottom of the threaded spindle portion 80. The oil-displaced air located in these spaces is vented upwardly and outwardly into the atmosphere through an oil-seal, later to be described, encircling the spindle shaft portion 72 and being in communication with the internal spaces as appears most clearly in Figure 2. It is to be understood that if filling takes place with the turntable in upside down position, however, the air is displaced by gravital flow of oil alone, the air venting through the drain hole. Thus, the interior spaces can be entirely filled with oil and, avoiding occluded air pockets which allow condensation of undesirable moisture in the oil bath, the condensate under extreme cold even congealing to form ice, a most undesirable state of affairs yet one which is frequently encountered in fifth wheels of the kind heretofore used.

Relative rotation between spindle and body is effected with a minimum of frictional resistance. Interposed between the first stepped-down portion 73 of the spindle shaft and the first counterbored portion 43 of the bearing housing is an anti-friction bearing, generally designated 91, comprising an inner race 92 having a press fit on the shaft portion 73 and an outer race 93 tightly fitted within the counterbored portion 43. Interposed between the outer race 93 and the inner race 92 is a plurality of rollers preferably of the tapered roller type, designated 95, in a cage 96. The tapered roller bearing of the kind illustrated is conveniently of a standard type utilized for heavy anti-friction bearing purposes, with the rollers in a tipped or inclined position outwardly and upwardly, as appears most clearly in Figure 2, the bearing being effective in this attitude to resist not only the heavy downward thrust exerted by the weight supported by the spindle flange but also such horizontal forces as might be imposed on the bearing. Thus, the roller bearing serves to keep in constant relative position the rotating spindle with respect to the bearing housing despite horizontal or lateral forces tending to displace the axis of the housing from the axis of the spindle. In addition, the bearing also resists the very considerable downward gravital thrust of the weight from above, transmitting the trailer-imposed weight to the bearing housing and thence to the supporting dolly.

Comparable in construction but having tapered rollers 100 in a roller cage 101 inclining in a downwardly and outwardly direction is a second anti-friction bearing 102, spaced below and being smaller than the upper bearing, and comprising in quite a comparable fashion, an outer race 103 and an inner race 104. The outer race 103 is fitted to a close fit within the counterbored portion 51 and bears at its upper end against the bearing housing shoulder 52. The inner race 104, on the other hand, is closely fitted on the stepped-down portion 76 of the spindle shaft and is supported on its bottom edge 106 by a take-up nut 107, by a locking washer 108, and a lock nut 109.

Serving not only to confine the lubricating oil within the oil-bath but to prevent the entry from the outside atmosphere of harmful foreign matter, such as dust and moisture, is an oil seal 110 held by a collar 115 mounted preferably on the turntable body, the seal being resilient and frictionally pressing or bearing against the spindle shaft portion 72. The oil seal 110 is oriented so as to block the inward movement of harmful external foreign matter and to allow the escape of lubricating oil, in the event the oil-bath pressure exceeds a predetermined amount (owing, for example, to heating and consequent expansion of the oil). It is to be noted that from the interior side of the closure plate up to the inner side of the oil seal there exist numerous interconnecting oil passageways. While sometimes labyrinthine in nature, as for example, the passageways between the housing shoulder 48 and the upper ball bearing, and between the upper bearing and the oil seal, nevertheless lubricating oil is able to move under ordinary conditions to and from the filling and draining plug area to and from all portions of the bath. It is especially to be noted that the orientation of the oil seal 110 not only allows the escape of oil in the event of excessive oil pressure but also permits air from the interior spaces to vent outwardly to the atmosphere during oil filling of the turntable with the turntable in the installed or in situ attitude shown, for example, in Figure 2, the oil entering through the bottom hole 57 under pressure and forcing the air ahead of it upwardly and outwardly through the oil seal 110. The appearance of oil emerging through the seal serves conveniently to notify the mechanic that the turntable is full of oil and that the filling operation can be stopped.

The spindle mounting flange 67 is secured by through-bolts 70 to the trailer frame 7 which conveniently includes a horizontally disposed mounting plate 111. The plate 111 has a plurality of openings 112 formed therein in a circular pattern in registry with the corresponding bolt holes of the spindle mounting flange and in the center of the circular pattern of the openings 112 is a circular opening 113 through which the ball check valve 84 projects. It is to be noted that the top of the ball check valve is at an elevation higher than the top surface of the frame mounting plate. This elevated construction is important in preventing an undue accumulation of foreign matter around the ball check orifice and is useful in holding to a minimum the foreign material which otherwise would tend to clog the top of the ball check valve. For ease of installation, it has been found helpful to counterbore to a shallow depth a concentric circular portion 114 on the underneath side of the frame mounting plate, the portion 114 having a diameter slightly larger than the diameter of the spindle mounting flange. The counterbored portion 114 is a useful adjunct to the turntable entity and not only adds to the stability of the mounting but also serves to assist in registering the corresponding openings in the flange and in the plate for inserting the through-bolts.

The trailer frame mounting plate 111 is conveniently mounted on trailer frame members as by welding to a longitudinal channel member 116 on each side of the trailer and transverse channel bracing members 117 extending between the longitudinal channels 116. On top of the longitudinal channel is disposed the load or the cargo carried by the trailer.

It is to be noted that owing to the unitary nature of the oil-bath turntable of our invention, turntable entities or units can be manufactured and assembled and filled with oil in surroundings most suitable to performing those various operations. Similarly, the turntable entity at regular maintenance intervals, or at any repair period desired, can be quickly and easily removed as a unit from the trailer and subjacent dolly and taken to a shop for necessary repair and maintenance without any necessity of effecting the steps of repair and maintenance on the trailer itself which ordinarily would be located in the trailer yard or in some other place distant from proper facilities. Merely by utilizing wrenches or other simple tools in the trailer yard, and by connecting or disconnecting fastenings 29 and 112 only, ordinary workmen are able to mount and dismount our oil-bath turntable unit on or from the trailer frame and dolly, thus permitting the more complicated operations associated with repair and maintenance to be easily carried out in a shop having adequate facilities and skilled mechanics.

The unitary aspect of the turntable is especially useful in assembling the dolly and trailer frame with the interposed turntable. Since the spindle and the bearing housing come from the shops in a predetermined correct position of rotation, no special lining up of the trailer frame and the dolly is necessary. The bearing housing is first lowered into the well or opening in the dolly and bolted. Then the trailer frame is shifted around until the counterbored portion 114 on the frame slips over the spindle mounting flange. At this point, without any further need for maneuvering, the trailer frame and the dolly are in a fixed and correct position of relative rotation. Bolting of trailer frame to spindle flange can then readily be effected, providing a positive and strong fastening between the spindle and trailer frame and between the dolly and housing.

The full-floating, oil-bath turntable of our invention has proven to be not only simple to install and remove but has also successfully operated for long periods despite severe conditions and extremes of weather.

What is claimed is:

1. As an article of manufacture, a full-floating oil-bath turntable comprising a bearing housing flanged at one end for mounting on a first frame member and having a central opening extending from said one end to the other end thereof, a spindle flanged at one end for mounting on a second frame member whereby said second frame member is positioned to a predetermined location with respect to said first frame member for rotation thereon, said spindle including a shaft extending from said spindle flange into said central opening in said bearing housing and terminating at a location within said central opening, said shaft being concentrically spaced from the walls of said central opening to form a continuous passageway for lubricating oil from said other end of said central opening to said one end thereof, a pair of anti-friction bearings interposed between said shaft and said walls of said central opening, one of said bearings having rollers inclined in a direction outwardly and toward said one end of said central opening and the other of said bearings having rollers inclined in a direction outwardly and toward said other end of said central opening, said bearings having passageways therethrough for the flow of lubricating oil from said other end of said central opening to said one end thereof, a closure plate mounted on said bearing housing and covering said other end of said central opening and including a lubricating oil filling and draining plug, said closure plate being spaced from said other end of said shaft, a lubricating oil seal mounted on said one end of said bearing housing, said seal being in resilient contact with the periphery of said spindle to pass excess lubricating oil outwardly to the atmosphere and substantially prevent inward movement of moisture and dust from the atmosphere, and a ball check valve mounted on said spindle connecting through a passageway in said spindle with said space between said other end of said spindle shaft and said closure plate, said valve being effective to relieve excess internal lubricating oil pressure and to prevent movement of external matter into said lubricating oil-bath and to vent oil displaced air to the atmosphere during oil filling.

2. An anti-friction bearing turntable for full trailers comprising a substantially horizontal first plate mounted on a full trailer frame, a substantially horizontal second plate below said first plate and mounted on a wheel truck frame of a full trailer, said wheel truck frame being subjected to variable horizontal forces exerted by a draw bar and vertical forces transmitted by frame supporting springs, a turntable housing mounted on said second plate and having its longitudinal axis vertically disposed, a spindle mounted on said first plate and depending downwardly within the interior of said turntable housing, the axis of said spindle substantially coinciding with said axis of said turntable housing, a pair of vertically spaced anti-friction bearings concentric with said axes and interposed between said spindle and said turntable housing for resisting said vertical and said horizontal forces and maintaining said axes in substantial coincidence, a cover plate mounted on the bottom end of said turntable housing below said spindle, a lubricating oil seal on the upper end of said housing in contact with said spindle, and a check valve on the upper end of said spindle in communication with the interior of said bearing housing, there being a continuous passageway for lubricating oil from the inner portion of said cover plate to the inner side of said oil seal.

3. A full-floating oil-bath turntable for full trailers comprising a trailer frame plate, a spindle mounted on said trailer frame plate and depending substantially vertically therefrom, said spindle including a mounting plate, a first stepped-down cylindrical portion, a second stepped-down cylindrical portion, and a third stepped-down cylindrical portion, a wheel truck frame plate below said trailer frame plate in position of substantial parallelism thereto, said wheel truck frame plate having an aperture concentric with said spindle, a bearing housing mounted on said wheel truck frame plate and depending vertically downwardly through said aperture, said bearing housing being hollowed out to receive said spindle, a bottom cover plate mounted on the lower end of said bearing housing to confine lubricating oil therein and being spaced from the lower end of said spindle, an oil drain and filling plug on said bottom cover plate, an oil retaining seal mounted on the upper end of said bearing housing and contacting said first stepped-down portion of said spindle to prevent the passage of outside moisture into said lubricating oil, a first antifriction bearing interposed between said bearing housing and said second stepped-down portion of said spindle, a second anti-friction bearing interposed between said bearing housing and said third stepped-down portion of said spindle, said bearings maintaining said frame plates in said position of substantial parallelism during rotation of said frame plates, and a check valve mounted on the top side of said spindle mounting plate and communicating with said space between said bottom cover plate and said lower end of said spindle through an axial channel in said spindle.

4. An oil-bath turntable for mounting on a trailer frame and a trailer dolly with the turning axis of said turntable substantially vertical comprising a housing of circular cylindrical contour, a first circular flange extending outwardly at the upper end of said housing and having apertures therein for mounting bolts, anti-friction bearings in said housing, a spindle mounted in said bearings for rotation about a vertical axis and projecting upwardly out of said housing, a second circular flange extending outwardly at the upper end of said spindle and closely overlying said first circular flange and having apertures therein for mounting bolts, a yielding shaft seal on said housing between said flanges and contacting said spindle, and a pressure relief valve communicating with the interior of said housing.

References Cited in the file of this patent

UNITED STATES PATENTS

| | | |
|---|---|---|
| 754,751 | Cowing | Mar. 15, 1904 |
| 1,169,152 | Hess | Jan. 25, 1916 |
| 1,436,259 | Hovey | Nov. 21, 1922 |
| 1,635,689 | Rauch | July 12, 1927 |
| 1,649,285 | Buckwalter | Nov. 15, 1927 |
| 1,943,735 | Linton | Jan. 16, 1934 |
| 2,666,367 | Berthiez | Jan. 19, 1954 |
| 2,673,746 | Thompson | Mar. 30, 1954 |

FOREIGN PATENTS

| | | |
|---|---|---|
| 655,782 | France | Apr. 23, 1929 |